(12) United States Patent
Crisan et al.

(10) Patent No.: US 7,437,741 B2
(45) Date of Patent: Oct. 14, 2008

(54) METHOD, SYSTEM, AND PROGRAM FOR INVOKING METHODS BETWEEN COMPUTER LANGUAGES

(75) Inventors: Valer-Alin Crisan, San Jose, CA (US); Mary Ann Roth, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/795,644

(22) Filed: Mar. 8, 2004

(65) Prior Publication Data

US 2005/0198619 A1 Sep. 8, 2005

(51) Int. Cl.
*G06F 13/00* (2006.01)
(52) U.S. Cl. ...................................... 719/330
(58) Field of Classification Search .................. 719/330
See application file for complete search history.

(56) References Cited

U.S. PATENT DOCUMENTS

| | | | |
|---|---|---|---|
| 5,097,533 A | | 3/1992 | Burger et al. |
| 5,369,766 A | | 11/1994 | Nakano et al. |
| 6,066,181 A | * | 5/2000 | DeMaster .................. 717/148 |
| 6,226,690 B1 | | 5/2001 | Banda et al. |
| 6,349,343 B1 | | 2/2002 | Foody et al. |
| 6,542,900 B1 | | 4/2003 | Xia |
| 6,611,844 B1 | | 8/2003 | Saulpaugh et al. |
| 6,901,588 B1 | * | 5/2005 | Krapf et al. ................. 717/164 |

FOREIGN PATENT DOCUMENTS

WO WO-01/79997 10/2001

OTHER PUBLICATIONS

Javasoft, Sun Microsystems, Inc. *JavaNative Interface Specification. Release 1.1*, 93 pages, 1996,1997.
The Java™ Tutorial. *Lesson: Overview of JNI* [online], 2 pages.
Beaty, K.A., Jr., "APL2 Calling C Routines that use Double Referencing Parameters", *IBM Technical Disclosure Bulletin*, vol. 35, No. 2, Jul. 1992, pp. 308-309.
Beazley, D.M., "Interfacing C/C++ and Python with Swig", [online], Nov. 1998, [Retrieved on May 20, 2005], pp. 1-115.
IBM Corporation, "Method to Hide JNI Plumbing Details from Programmer", *IBM Research Disclosure*, vol. 452, No. 87, Dec. 2001.
PCT International Search Report and Written Opinion, Jun. 6, 2005, for International Application No. PCT/EP2005/050853.

(Continued)

*Primary Examiner*—Andy Ho
(74) *Attorney, Agent, or Firm*—David W. Victor; Konrad Raynes & Victor LLP

(57) ABSTRACT

Provided are a method, system, and program for invoking methods between computer languages. A plurality of subclasses of a class in a first computer language are instantiated and a plurality of subclasses of a class in a second computer language are instantiated, wherein methods in the subclasses in the second computer language implement functionality of methods in the subclasses in the first computer language. A call is received from an application in the first computer language to one method in the subclasses of the first computer language, wherein the call to the method in the subclass of the first computer language invokes a corresponding method in the subclasses of the second computer language that implements the functionality of the called method in the first computer language.

41 Claims, 4 Drawing Sheets

OTHER PUBLICATIONS

PCT Demand and Response to Written Opinion, Jul. 25, 2005, for International Application No. PCT/EP2005/050853.

PCT International Preliminary Examination Report, May 15, 2006, for International Application No. PCT/EP2005/050853.

* cited by examiner

METHOD, SYSTEM, AND PROGRAM FOR INVOKING METHODS BETWEEN COMPUTER LANGUAGES

BACKGROUND OF THE INVENTION

1. Field of the Invention

The present invention relates to a method, system, and program for invoking methods between computer languages.

2. Description of the Related Art

On a computing platform, programs written in one computer language may need to call methods implemented in programs in a different computer language. This need for cross-platform accessibility is common because many programs, including legacy programs, are written in C++ and many newer programs, including methods that are desirable to make available to the legacy programs, are written in the Java™ computer language. (Java is a trademark of Sun Microsystems, Inc.).

The Java Native Interface (JNI) programming interface allows Java code running in a Java Virtual Machine (JVM) to operate with applications and libraries written in other languages, such as C, C++, and assembly. The JNI framework allows the native methods to utilize and create Java objects, and then inspect and use these objects to perform tasks. Both the native language side and the Java side of the application can create, update and access Java objects and share the objects. The native code accesses the Java methods by calling JNI methods. The JNI framework is discussed in the publication "Java Native Interface Specification, Release 1.1" (Copyright Sun Microsystems, Inc. 1997).

BRIEF DESCRIPTION OF THE DRAWINGS

Referring now to the drawings in which like reference numbers represent corresponding parts throughout.

SUMMARY

Provided are a method, system, and program for invoking methods between computer languages. A plurality of subclasses of a class in a first computer language are instantiated and a plurality of subclasses of a class in a second computer language are instantiated, wherein methods in the subclasses in the second computer language implement functionality of methods in the subclasses in the first computer language. A call is received from an application in the first computer language to one method in the subclasses of the first computer language, wherein the call to the method in the subclass of the first computer language invokes a corresponding method in the subclasses of the second computer language that implements the functionality of the called method in the first computer language.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
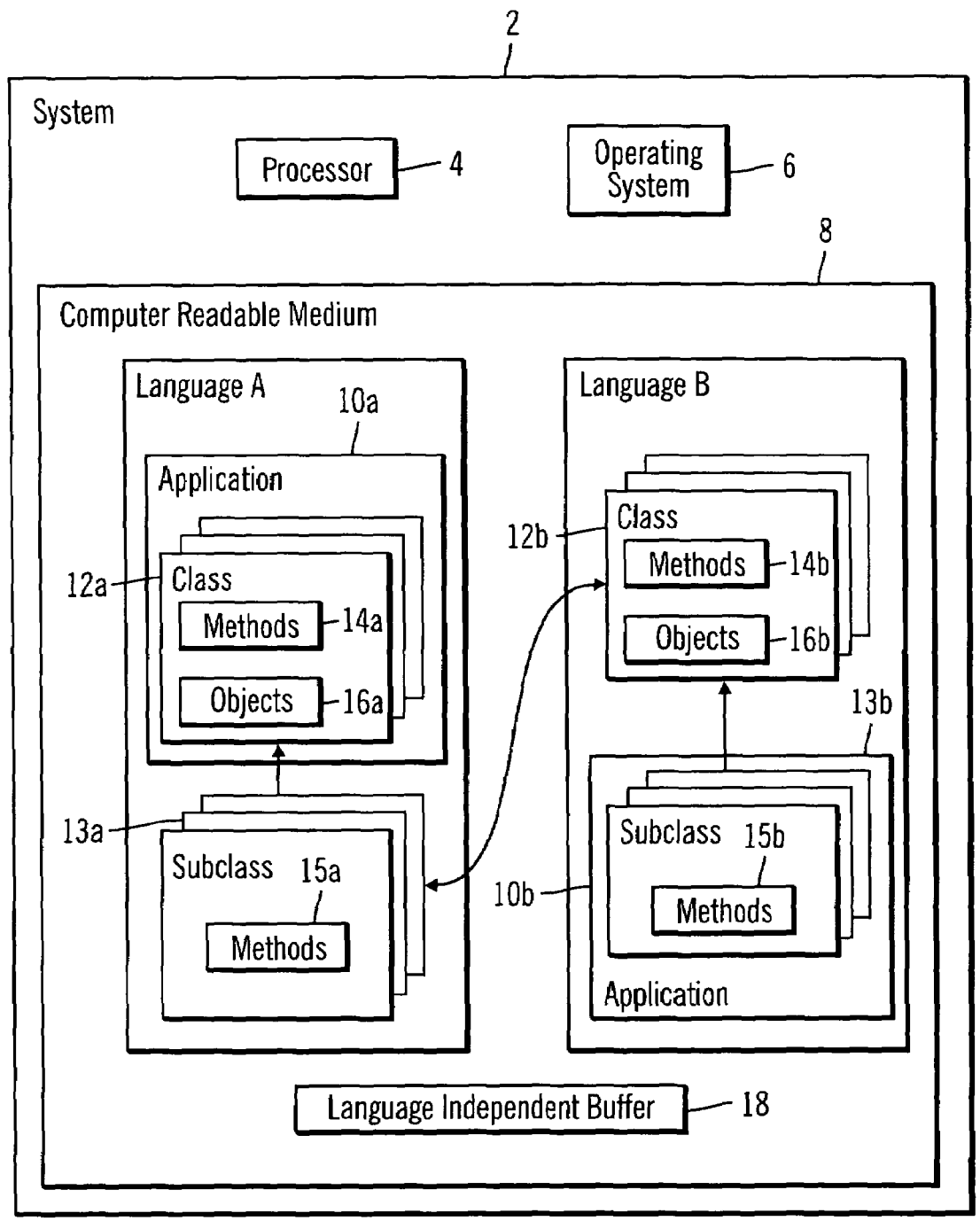
FIG. 1 illustrates a computing environment in which embodiments are implemented.

FIG. 1 illustrates a computing environment in which embodiments of the invention are implemented. A system 2 includes one or more processors 4 and an operating system 6. The system 2 includes a computer readable medium 8, which may be implemented as volatile memory, non-volatile memory or a combination thereof. If the computer readable medium 8 is a combination of different memory device types, e.g., volatile and non-volatile, then data may be swapped therebetween. The computer readable medium 8 includes applications 10a, 10b, Classes 12a, 12b and subclasses 13a, 13b that are implemented in different language formats, Language A and Language B, respectively. Languages A and B may comprise different computer languages, such as object or non-object oriented languages. For instance, if the Languages A and B are object oriented languages, then one may comprise C or C++ and the other Java. Each Class 12a, 12b includes methods 14a, 14b and objects 16a, 16b, where the methods 14a, 14b are called by the applications 10a, 10b and to implement functionality and manipulate the objects 16a, 16b. The subclasses 13a, 13b extend the Classes 12a, 12b and overload a sub-set of the methods 14a, 14b by the methods 15a, 15b. A language independent buffer 18 is used to pass data from methods in the different Languages A and B, such as between methods 14a, 15a and 14b, 15b.

In certain embodiments, there is a set of Classes 12a that contain methods 14a and objects 16a in a Language A published by an application 10a that are intended to be made available to applications 10b written in Language B. To make the Classes 12a available to applications 10b, a set of Classes 12b is built that contain the methods 14b and objects 16b in a one-to-one correspondence with the Classes 12a, methods 14a and objects 16a in the Language A. Further, in certain embodiments, the Classes 12a are subclassed into Language A subclasses 13a. The methods 15a are implemented in the Language A subclasses 13a, where the subclasses 13a communicate with the methods 14b in the Classes 12b to transfer the state information represented by the objects 16a into the objects 16b. Further, methods 14b in Language B provide an implementation of the methods 14a implemented in the Classes 12a. The methods 14b might implement in Language B the functionality of the methods 14a or they might call the appropriate methods 14a in Language A. In this way, there is a set of Classes 12b containing the methods 14b and objects 16b published in Language B and the applications 10b in Language B may extend and use the Classes 12b, implement/invoke the methods 14b and use the objects 16b. The application subclasses are indicated in FIG. 1 as subclasses 13b containing the methods 15b.

Figure 2:
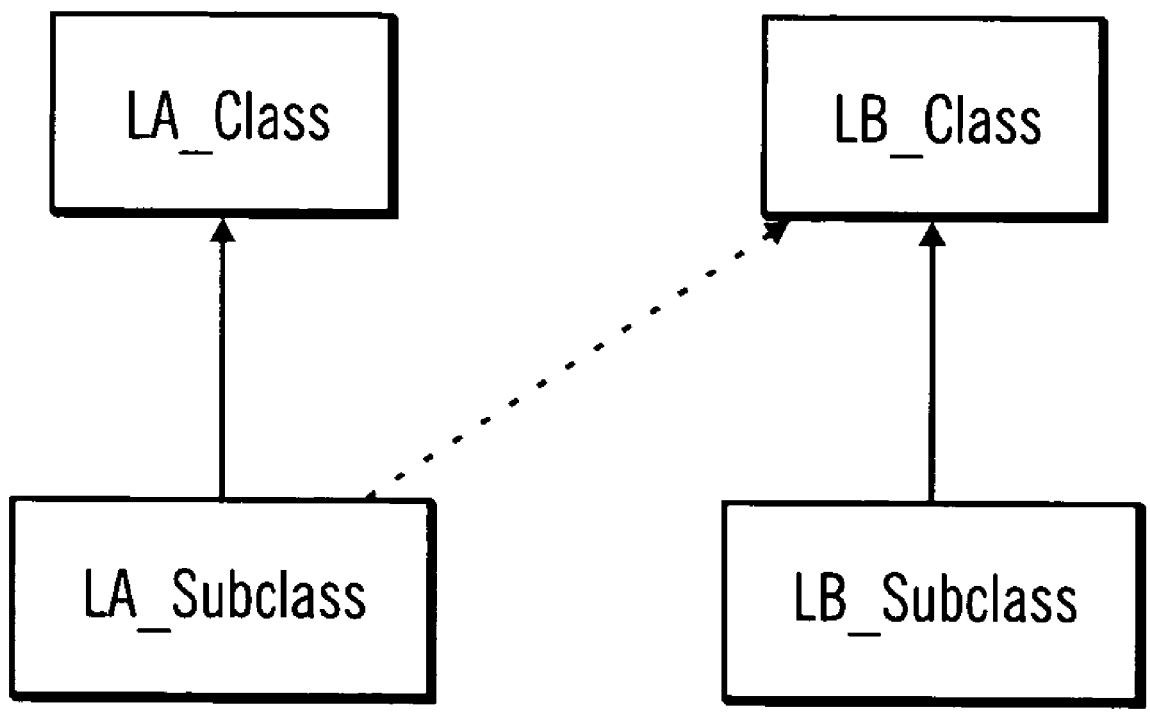
FIG. 2 illustrates a relationship of classes in accordance with embodiments.

FIG. 2 illustrates a class diagram illustrating a relationship of classes in the different Languages A and B, Language A denoted by "LA" and Language B denoted by "LB". The LA Class is a class published to applications 10a in Language A. To allow the methods 14a in Language A to invoke corresponding methods 14b in Language B the LA Class is extended into an LA subclass and the LB Class is published to applications 10b in Language B. The application 10b extends the LB Class 2b into the LB subclass 13b. The application 10a in Language A uses the LA subclass 13a to invoke methods 15b in Language B by calling the methods 15a in the LA subclass 13a. In response to such calls, the methods 15a forward their calls to the LB Class 12b via calls invoked in the LB Class 12b, which cause the LB 12b Class to invoke methods 15b in the LB subclass 13b.

Similarly, applications 10b in Language B use the LB subclass 13b to invoke methods 14a in Language A by calling the methods 14b in the LB Class 12b, which in turn cause the methods 14b to forward their calls to the LA Class 12a. When the application 10a in Language A invokes a method 14a that is implemented in the subclass 13a by a method 15a, the calls are forwarded by the method 15a in the LA subclass 13a to the LB subclass 13b in Language B to invoke the corresponding subclass method 15b. Similarly, applications 10b in Language B use the LB Class to invoke methods 14a in Language A by the fact that the methods in LB Class are forwarding the calls to LA Class 12a in Language A. The entire forwarding and language-switching processes are transparent for the application, such as the application 10a invokes only the methods 14a and 15a on the LA subclass while the application 10b invokes only the methods 14b and 15b on the LB Class. In this way, the LA and LB subclasses comprises extension classes used to allow methods in one language to invoke methods implemented in another language.

Figure 3:
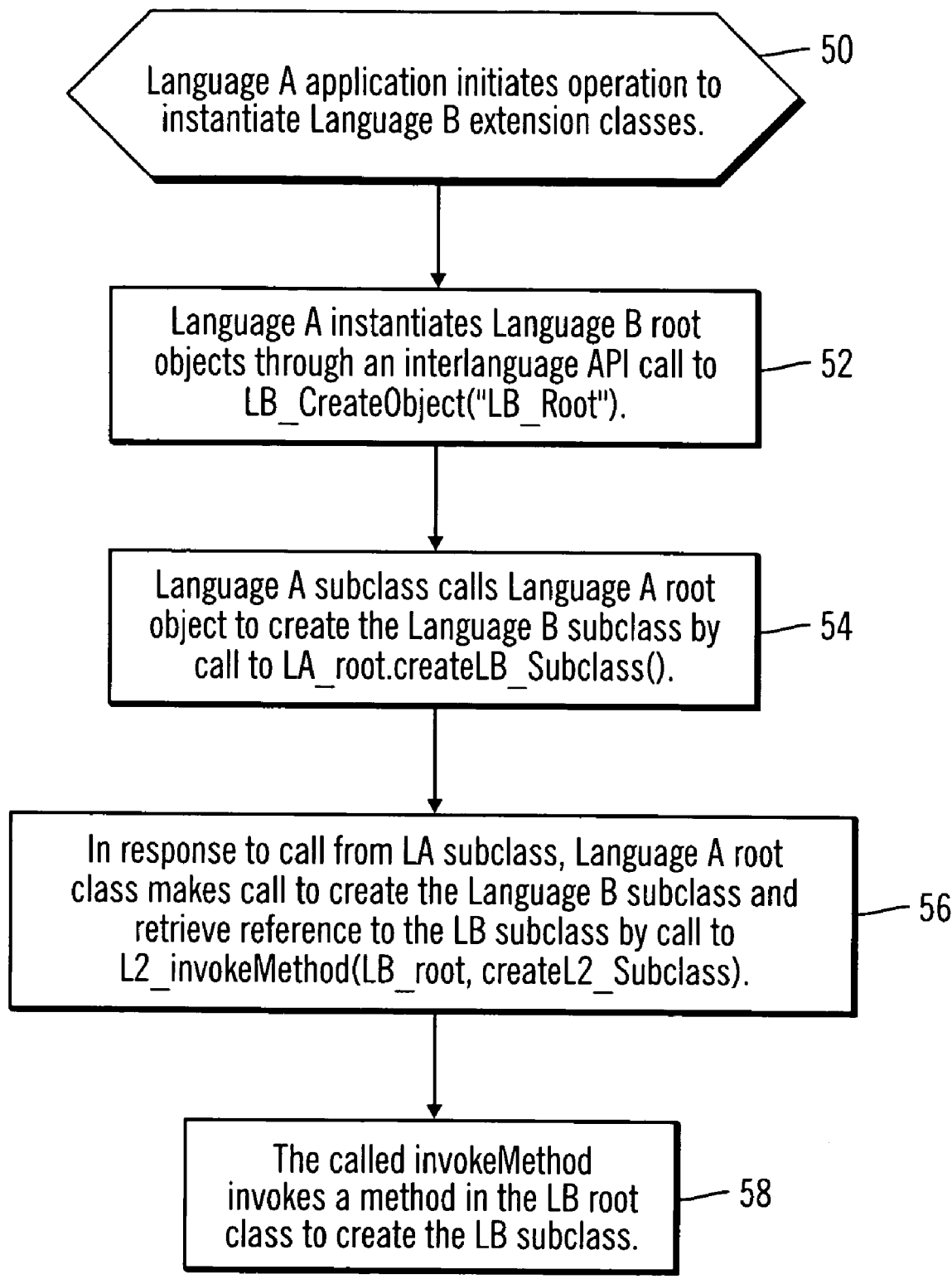
FIGS. 3 and 4 illustrate operations performed to make interlanguage method calls in accordance with embodiments.

FIG. 3 illustrates operations to create the subclasses in the corresponding language. At block 50, a Language A application 10a initiates operations to instantiate an LA subclass 13a. The Language A subclasses 13a have knowledge of the Language B Root Class that is mapped to a Language A root (LA root). In a first phase, which may be executed once, the LA root is created and it instantiates (at block 52) a Language B root object (LB root) through an inter-language API call to the Language B method LB_CreateObject ("LB_Root"). Then a Language A subclass 13a calls the Language A root object to create an instance for the appropriate Language B subclass. All Language B subclasses 13b can be instantiated through the Language B Root Class. In this way, the Language A subclasses need to only have knowledge of the Language B Root Class to instantiate Language B subclasses. The Language A applications 10a may then create objects by invoking methods on the LB Root Class. After the LA Root Class instantiates the Language B root object, the Language A subclass (LA subclass) calls (at block 54) the Language A root object to create the Language B subclass. The LA subclass call to the LA root object to create the Language B subclass instance may be of the form LA_root.createLB_Subclass( ). In response to the call from the LA subclass, the called Language A root object makes (at block 56) a call to create the LB subclass instance and retrieve a reference to the LB subclass, e.g., by a call to LB_invokeMethod(LB_root, createL2_Subclass). The called invokeMethod invokes (at block 58) a method in the LB Root Class to create the LB subclass instance.

The Language B objects may be deleted in a similar manner as the create operations described with respect to FIG. 3, by a call to a delete method from the LA subclass to the LA root object, which calls an LB invoke method in the LB Root Class to delete the LB subclass instance.

Figure 4:
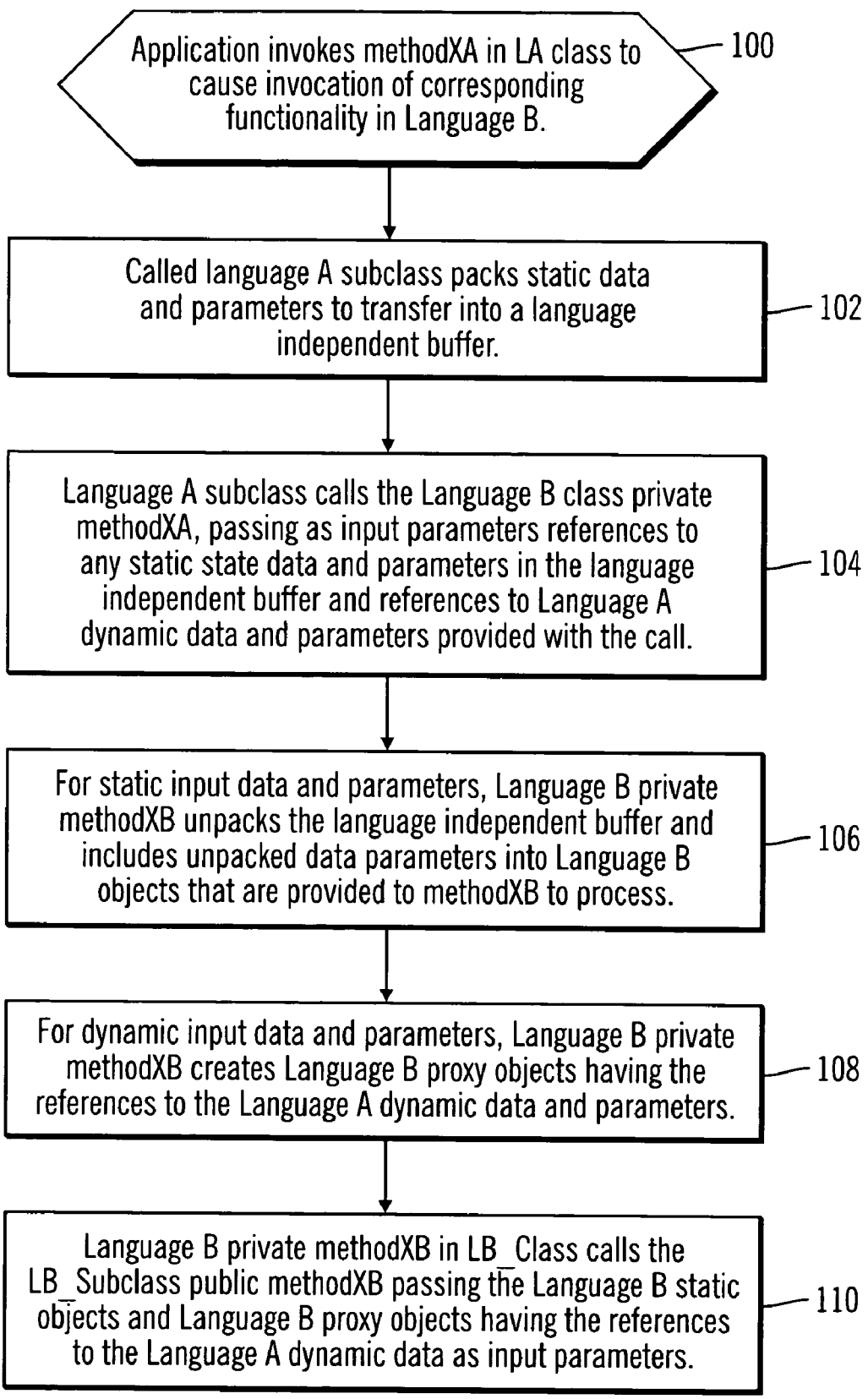

FIG. 4 illustrates operations performed to allow transparent invocation of methods 14b, 15 in Language B from the applications 10a invoking corresponding methods 14a, 15a in Language A. At block 100, application 10a invokes a methodXA published by the LA Class implemented in the LA subclass. "MethodX" describes a method or function having functionality denoted by the "X" that is implemented in a language denoted by the letter following "X", e.g., "A" for Language A. The application 10a invoking MethodXA in Language A may pass object state data and/or method parameters with the call in the format of Language A, where the passed data and parameters may be dynamic or static. Static data is data that is set once and once set for an object does not change and dynamic data is modified frequently by methods 14a, 15a and 14b, 15b in both Languages A and B. In the described embodiments, the LB subclass includes an implementation of the functionality of methodX in Language B as public "methodXB". The public methodXB may take as input static and/or dynamic data in the Language B format.

Upon invoking methodXA in the LA subclass, the called methodXA packs (at block 102) any static input data and/or parameters to the call into the language independent buffer 18. If the input data does not include static data, then the operation at block 102 is not performed. The methodXA in the LA subclass calls (at block 104) the Language B Class private methodXB, passing as input parameters references to any static state data and static parameters in the language independent buffer 18 and/or any references to Language A dynamic data and parameters provided with the call to methodXA. Thus, for static data, references to the static data in the buffer 18 are provided whereas for dynamic data, references to the actual dynamic data or objects 16a in Language A are provided because such data in the Language A objects 16a may change. For static input data and parameters, the invoked Language B private methodXB unpacks (at block 106) the language independent buffer 18 and includes the unpacked parameters into Language B objects 16b including the static data or parameters that are provided to methodXB to process. For dynamic input data and parameters, the Language B private methodXB creates (at block 108) Language B proxy objects having the references to the Language A dynamic data and parameters. In certain embodiments, the methodXB may use JNI calls to use the references to the dynamic data in the Language B proxy object to obtain the dynamic data from the Language A dynamic objects 16a and/or parameters. The Language B private methodXB in the LB Class then calls (at block 110) the LB subclass public methodXB passing as input data to the call the Language B static objects or Language B proxy objects having the references to the Language A dynamic data.

With the described embodiments, the methodXB provides an implementation of the Language A methodXA in Language B. In certain embodiments, a request/reply method invocation model is used, where the requester sends a message to a recipient for some work to be performed. Once the work has been completed, the recipient may return results or just a confirmation of completion back to the requestor. In certain embodiments, the Language A methodXA called from the LA subclass waits for the Language B methodXB to return complete before continuing execution. In this way, data cannot be changed by a Language A method 14a, 15a during the execution of the Language B methods 14b, 15b being invoked to ensure data consistency is maintained across languages.

Described embodiments provide a technique to provide mirrored classes of classes in a first computer language in a second computer language, where the mirror classes in the second computer language provide an extension of the classes in the first computer language into the second computer language. The mirror classes ensure that the creation and use of objects from the first language will cause objects to be created and used in the second language.

Still further, with the described embodiments, the legacy applications, such as Language A applications, require no modification to make the object oriented language programs, such as Language B applications, accessible to the Language A applications. Further, a common runtime environment may not be required to manage the inter-language operability, thus minimizing both the performance impact to the overall system and maintenance cost. Further, the Language A programs are not altered to implement the interoperability, thus providing a significant savings in implementation costs.

Additional Embodiment Details

The embodiments described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method executing within a computer, comprising:
   instantiating a plurality of subclasses of a class in a first computer language;
   instantiating a plurality of subclasses of a class in a second computer language, wherein methods in the subclasses in the second computer language implement functionality of methods in the subclasses in the first computer language; and
   receiving a call from an application in the first computer language to one method in the subclasses of the first computer language, wherein the call to the method in the subclasses of the first computer language invokes a corresponding method in the subclasses of the second computer language that implements the functionality of the called method in the first computer language.

2. The method of claim 1, wherein instantiating the subclasses in the second computer language comprises:
   receiving a call to create an object in the first computer language;
   creating a root object in the second computer language; and
   calling, by one subclass in the first computer language, a create method to create one corresponding subclass in the second computer language, wherein the created root object in the second computer language is passed with the create method call.

3. The method of claim 2, wherein the root object in the second computer language is received in response to the call to create the object in the first computer language, wherein the call to create the subclass in the second computer language is in a Root Class in the first computer language also including the method invocation to create the root object in the second computer language.

4. The method of claim 3, wherein the invoked create method in the Root Class in the first computer language invokes a create method in a Root Class in the second computer language to create the corresponding subclass in the second computer language.

5. A method executing within a computer, comprising:
   providing a class and subclasses in a first computer language and a class and subclasses in a second computer language, wherein methods in the subclasses in the second computer language implement functionality of methods in the subclasses of the first computer language;
   receiving a call to a first method in the subclasses of the first computer language;
   invoking, by the called first method, a second method in the second computer language passing a reference to input data;
   generating, by the called second method, objects in the second computer language based on the reference to the input data; and
   executing a third method in the second computer language that processes the generated object and performs the functionality of the first method.

6. The method of claim 5, further comprising:
   adding, by the first method, the input data to the first method to a buffer, wherein the first method calls the second method with a reference to the buffer including the input data, wherein the object in the second computer language includes the input data referenced in the buffer.

7. The method of claim 6, wherein the input data in the first computer language comprises static data.

8. The method of claim 5, wherein the first method passes the reference to the input data to the called second method, and wherein the objects generated by the second method comprise proxy objects in the second computer language including references to the input data in the first computer language.

9. The method of claim 8, wherein the input data in the first computer language comprises dynamic data.

10. The method of claim 5, wherein the second method calls the third method and passes the generated object with the call.

11. The method of claim 10, wherein the second computer language comprises an object oriented computer language, wherein the second method comprises a private method and the third method comprises a public method.

12. The method of claim 5, wherein the first method waits for a response from the invoked second method before continuing execution.

13. The method of claim 5, wherein the subclasses in the first and second computer languages execute in a same address space.

14. A system, comprising:
a computer readable storage medium;
programs of a first computer language and second computer language in the computer readable storage medium; and
circuitry executing the programs to perform operations, the operations comprising:
instantiating a plurality of subclasses of a class in the first computer language;
instantiating a plurality of subclasses of a class in the second computer language, wherein methods in the subclasses in the second computer language implement functionality of methods in the subclasses in the first computer language; and
receiving a call from an application in the first computer language to one method in the subclasses of the first computer language, wherein the call to the method in the subclasses of the first computer language invokes a corresponding method in the subclasses of the second computer language that implements the functionality of the called method in the first computer language.

15. The system of claim 14, wherein instantiating the subclasses in the second computer language comprises:
receiving a call to create an object in the first computer language;
creating a root object in the second computer language; and
calling, by one subclass in the first computer language, a create method to create one corresponding subclass in the second computer language, wherein the created root object in the second computer language is passed with the create method call.

16. The system of claim 15, wherein the root object in the second computer language is received in response to the call to create the object in the first computer language, wherein the call to create the subclass in the second computer language is in a root class in the first computer language also including the method invocation to create the root object in the second computer language.

17. The system of claim 16, wherein the invoked create method in the root class in the first computer language invokes a create method in a root class in the second computer language to create the corresponding subclass in the second computer language.

18. A system, comprising:
a computer readable storage medium;
programs of a first computer language and second computer language in the computer readable storage medium; and
circuitry executing the programs to perform operations, the operations comprising:
providing a class and subclasses in the first computer language and a class and subclasses in the second computer language, wherein methods in the subclasses in the second computer language implement functionality of methods in the subclasses of the first computer language;
receiving a call to a first method in the subclasses of the first computer language;
invoking, by the called first method, a second method in the second computer language passing a reference to input data;
generating, by the called second method, objects in the second computer language based on the reference to the input data; and
executing a third method in the second computer language that processes the generated object and performs the fUnctionality of the first method.

19. The system of claim 18, wherein the circuitry is capable of causing further operations comprising:
adding, by the first method, the input data to the first method to a buffer, wherein the first method calls the second method with a reference to the buffer including the input data, wherein the object in the second computer language includes the input data referenced in the buffer.

20. The system of claim 19, wherein the input data in the first computer language comprises static data.

21. The system of claim 18, wherein the first method passes the reference to the input data to the called second method, and wherein the objects generated by the second method comprise proxy objects in the second computer language including references to the input data in the first computer language.

22. The system of claim 21, wherein the input data in the first computer language comprises dynamic data.

23. The system of claim 18, wherein the second method calls the third method and passes the generated object with the call.

24. The system of claim 23, wherein the second computer language comprises an object oriented computer language, wherein the second method comprises a private method and the third method comprises a public method.

25. The system of claim 18, wherein the first method waits for a response from the invoked second method before continuing execution.

26. The system of claim 18, wherein the subclasses in the first and second computer languages execute in a same address space.

27. An article of manufacture comprising at least one of a hardware device having hardware logic and a computer readable storage medium having executable code to cause operations to be performed, the operations comprising:
instantiating a plurality of subclasses of a class in a first computer language;
instantiating a plurality of subclasses of a class in a second computer language, wherein methods in the subclasses in the second computer language implement functionality of methods in the subclasses in the first computer language; and
receiving a call from an application in the first computer language to one method in the subclasses of the first computer language, wherein the call to the method in the subclasses of the first computer language invokes a corresponding method in the subclasses of the second computer language that implements the functionality of the called method in the first computer language.

28. The article of manufacture of claim 27, wherein instantiating the subclasses in the second computer language comprises:
receiving a call to create an object in the first computer language;
creating a root object in the second computer language; and
calling, by one subclass in the first computer language, a create method to create one corresponding subclass in the second computer language, wherein the created root object in the second computer language is passed with the create method call.

29. The article of manufacture of claim 28, wherein the root object in the second computer language is received in response to the call to create the object in the first computer language, wherein the call to create the subclass in the second computer language is in a Root Class in the first computer language also including the method invocation to create the root object in the second computer language.

30. The article of manufacture of claim 29, wherein the invoked create method in the Root Class in the first computer language invokes a create method in a Root Class in the second computer language to create the corresponding subclass in the second computer language.

31. An article of manufacture comprising at least one of a hardware device having hardware logic and a computer readable storage medium having executable code to cause operations to be performed, the operations comprising:

provproviding a class and subclasses in a first computer language and a class and subclasses in a second computer language, wherein methods in the subclasses in the second computer language implement functionality of methods in the subclasses of the first computer language;

receiving a call to a first method in the subclasses of the first computer language;

invoking, by the called first method, a second method in the second computer language passing a reference to input data;

generating, by the called second method, objects in the second computer language based on the reference to the input data; and executing a third method in the second computer language that processes the generated object and performs the functionality of the first method.

32. The article of manufacture of claim 31, wherein the operations further comprise:

adding, by the first method, the input data to the first method to a buffer, wherein the first method calls the second method with a reference to the buffer including the input data, wherein the object in the second computer language includes the input data referenced in the buffer.

33. The article of manufacture of claim 32, wherein the input data in the first computer language comprises static data.

34. The article of manufacture of claim 31, wherein the first method passes the reference to the input data to the called second method, and wherein the objects generated by the second method comprise proxy objects in the second computer language including references to the input data in the first computer language.

35. The article of manufacture of claim 31, wherein the input data in the first computer language comprises dynamic data.

36. The article of manufacture of claim 31, wherein the second method calls the third method and passes the generated object with the call.

37. The article of manufacture of claim 36, wherein the second computer language comprises an object oriented computer language, wherein the second method comprises a private method and the third method comprises a public method.

38. The article of manufacture of claim 31, wherein the first method waits for a response from the invoked second method before continuing execution.

39. The article of manufacture of claim 31, wherein the subclasses in the first and second computer languages execute in a same address space.

40. The article of manufacture of claim 31, wherein the classes in the first computer language implement legacy applications, and wherein methods in the first computer language invoke methods in the second computer language implementing the functionality of the methods in the first computer language without requiring a change to the classes in the first computer language.

41. The article of manufacture of claim 31, wherein a common runtime environment is not needed for the methods in the first computer language to invoke methods in the second computer language implementing the functionality of the methods in the first computer language.

* * * * *